(12) United States Patent
Dubroy et al.

(10) Patent No.: US 12,737,349 B2
(45) Date of Patent: Sep. 15, 2026

(54) APPARATUSES, METHODS, AND COMPUTER PROGRAM PRODUCTS FOR CONFIGURING A DATA PARTITION BASED ON A DATA LEDGER ASSOCIATED WITH A DATA MIGRATION EVENT

(71) Applicant: ATLASSIAN PTY LTD, Sydney (AU)

(72) Inventors: Brett Dubroy, Sydney (AU); Andrei Beliaev, Coquitlam (CA)

(73) Assignee: ATLASSIAN PTY, LTD., Sydney (AU)

( * ) Notice: Subject to any disclaimer, the term of this patent is extended or adjusted under 35 U.S.C. 154(b) by 22 days.

(21) Appl. No.: 18/756,224

(22) Filed: Jun. 27, 2024

(65) Prior Publication Data

US 2026/0003855 A1 Jan. 1, 2026

(51) Int. Cl.

| | |
|---|---|
| ***G06F 16/24*** | (2019.01) |
| ***G06F 16/21*** | (2019.01) |
| ***G06F 16/23*** | (2019.01) |
| ***G06F 16/2455*** | (2019.01) |
| ***G06F 16/27*** | (2019.01) |

(52) U.S. Cl.

CPC ........ *G06F 16/2379* (2019.01); *G06F 16/214* (2019.01); *G06F 16/24568* (2019.01); *G06F 16/278* (2019.01)

(58) Field of Classification Search

CPC ............... G06F 16/2379; G06F 16/214; G06F 16/24568; G06F 16/27; G06F 16/278

See application file for complete search history.

(56) References Cited

U.S. PATENT DOCUMENTS

| | | | | |
|---|---|---|---|---|
| 11,159,613 | B2 * | 10/2021 | Carver | H04L 67/568 |
| 11,461,366 | B1 * | 10/2022 | Collins, Jr. | G06F 16/278 |
| 2022/0284008 | A1 * | 9/2022 | Treitlinger | G06F 16/2379 |
| 2023/0394024 | A1 * | 12/2023 | Xiong | G06F 16/2282 |
| 2024/0127252 | A1 * | 4/2024 | Loganathan | G06Q 20/0655 |
| 2024/0135344 | A1 * | 4/2024 | Pandey | G06Q 20/102 |
| 2025/0293884 | A1 * | 9/2025 | Gilchrist | H04L 9/3247 |
| 2025/0310423 | A1 * | 10/2025 | Meessen | H04L 67/63 |

* cited by examiner

*Primary Examiner* — Merilyn P Nguyen

(74) *Attorney, Agent, or Firm* — Alston & Bird LLP

(57) ABSTRACT

Methods, apparatuses, or computer program products that provide for configuring a data partition based on one or more data ledgers associated with a data migration event. In some examples, an event data object associated with a data migration event is detected by monitoring an event stream. In some examples, the data migration event is indicative of data stored in a first partition associated with the event data object being migrated to a second partition that is different than the first partition. In some examples, a data ledger associated with the data migration event is updated based on the event data object. In some examples, the data ledger is configured to store data migration activity information associated with the first partition, the second partition, and the event data object. In some examples, the second partition is updated based on the data migration activity information stored in the data ledger.

20 Claims, 7 Drawing Sheets

600

APPARATUSES, METHODS, AND COMPUTER PROGRAM PRODUCTS FOR CONFIGURING A DATA PARTITION BASED ON A DATA LEDGER ASSOCIATED WITH A DATA MIGRATION EVENT

BACKGROUND

It is often difficult to manage and/or support databases and/or data partitions of a server system in which inputs, components, data objects, and/or data storage requirements of the server system dynamically change. Through applied effort, ingenuity, and innovation, these identified deficiencies and problems have been solved by developing solutions that are configured in accordance with the embodiments of the present disclosure, many examples of which are described in detail herein.

BRIEF SUMMARY

In an embodiment, an apparatus comprises one or more processors and one or more storage devices storing instructions that are operable, when executed by the one or more processors, to cause the one or more processors to detect, by monitoring an event stream comprising a plurality of event data objects, an event data object associated with a data migration event. In one or more embodiments, the data migration event is indicative of data stored in a first partition associated with the event data object being migrated to a second partition that is different than the first partition. In one or more embodiments, the instructions are additionally or alternatively operable, when executed by the one or more processors, to cause the one or more processors to update a data ledger associated with the data migration event based at least in part on the event data object. In one or more embodiments, the data ledger is configured to store data migration activity information associated with the first partition, the second partition, and the event data object. In one or more embodiments, the instructions are additionally or alternatively operable, when executed by the one or more processors, to configure the second partition based at least in part on the data migration activity information stored in the data ledger.

In another embodiment, a computer program product comprises at least one non-transitory computer-readable storage medium having computer-readable program code portions stored therein, where the computer-readable program code portions comprising an executable portion are configured to detect, by monitoring an event stream comprising a plurality of event data objects, an event data object associated with a data migration event. In one or more embodiments, the data migration event is indicative of data stored in a first partition associated with the event data object being migrated to a second partition that is different than the first partition. In one or more embodiments, the computer-readable program code portions comprising an executable portion are additionally or alternatively configured to update a data ledger associated with the data migration event based at least in part on the event data object. In one or more embodiments, the data ledger is configured to store data migration activity information associated with the first partition, the second partition, and the event data object. In one or more embodiments, the computer-readable program code portions comprising an executable portion are additionally or alternatively configured to configure the second partition based at least in part on the data migration activity information stored in the data ledger.

In yet another embodiment, a computer-implemented method comprises detecting, by monitoring an event stream comprising a plurality of event data objects, an event data object associated with a data migration event. In one or more embodiments, the data migration event is indicative of data stored in a first partition associated with the event data object being migrated to a second partition that is different than the first partition. In one or more embodiments, the computer-implemented method additionally or alternatively comprises updating a data ledger associated with the data migration event based at least in part on the event data object. In one or more embodiments, the data ledger is configured to store data migration activity information associated with the first partition, the second partition, and the event data object. In one or more embodiments, the computer-implemented method additionally or alternatively comprises configuring the second partition based at least in part on the data migration activity information stored in the data ledger.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
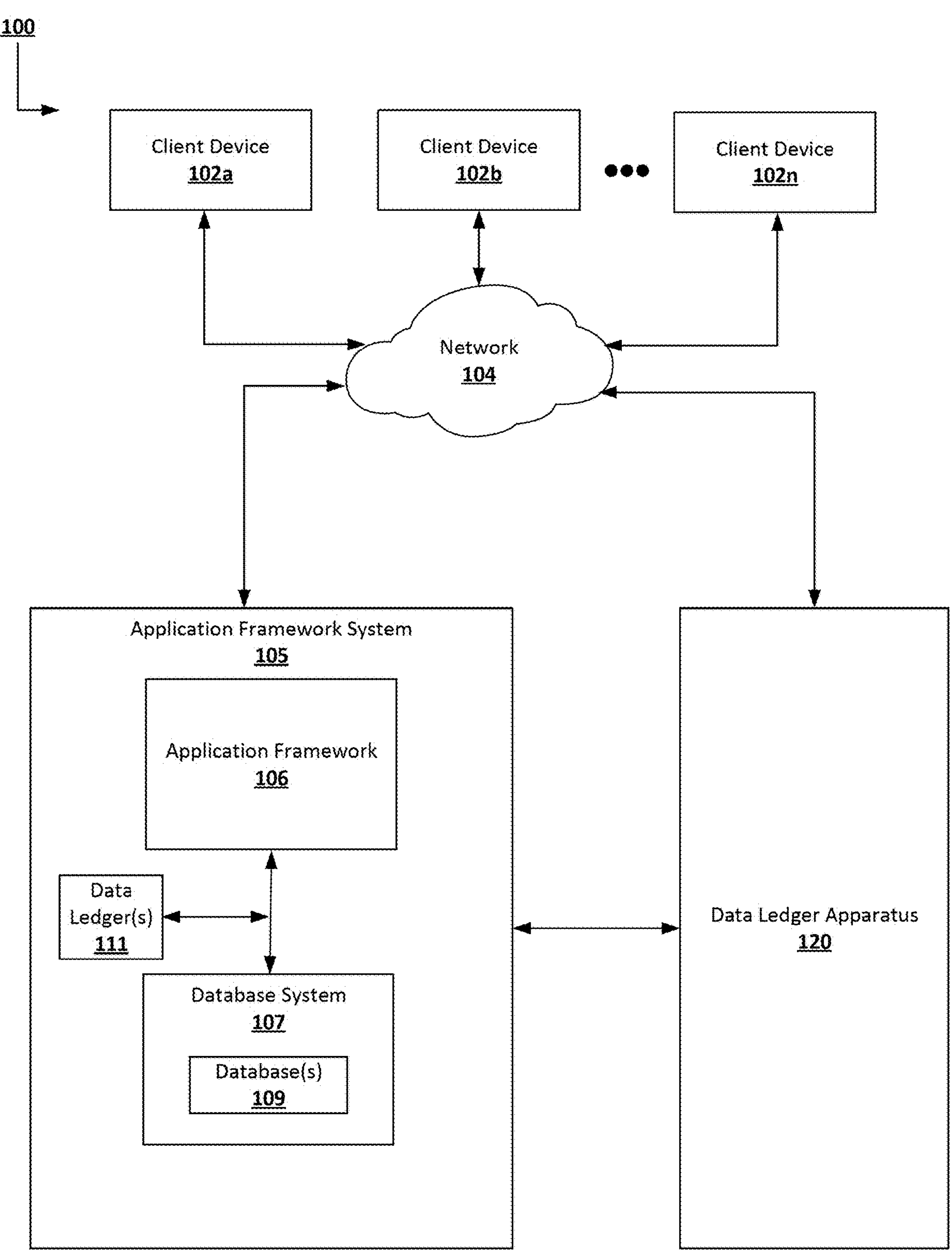
FIG. 1 is a block diagram of an example system within which one or more embodiments of the present disclosure may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing server systems such as, for example, managing databases, components, and/or data objects for a server system. The disclosed techniques may be provided by an apparatus integrated with an application framework where multiple components/resources and/or layers of components/resources interact with one another in several complex manners to provide collaborative applications and/or collaborative services. Various embodiments of the present disclosure additionally or alternatively address technical problems associated with managing and/or configuring data associated with data partitions for a server system.

An application framework (e.g., a cloud application framework) is typically characterized by a large number of the application components (e.g., services, microservices, and the like) that are offered by the application framework. Those application components typically include a large number of frontend application components and/or a large number of backend application components. One example application framework might include an enterprise instance of Jira®, an action tracking and project management software platform, developed by Atlassian Pty. Ltd. that may be licensed to Beta Corporation. Other software platforms may serve as application frameworks (e.g., Confluence®, Trello®, Bamboo®, Clover®, Crucible®, etc. by Atlassian Pty. Ltd) as will be apparent to one of ordinary skill in the art in view of the foregoing discussion.

Due to the scale and the numerosity of the application components, a large number of data objects may be generated by the application framework during a time interval. These created data objects may be generated for a variety of purposes and may be difficult to manage due to the sheer volume data objects and due to the complexity of the application framework. For example, the application framework may be configured as a collaborative application framework and data objects may be generated as a result of events, incidents, changes, component requests, alerts, notifications, workflows, service requests, service tickets, and/or other dynamic data related to the collaborative application framework. The data objects generated by an application framework may also relate to a business or enterprise that has deployed or licensed the application framework for managing events, incidents, changes, component requests, alerts, notifications, workflows, service requests, service tickets, and/or other dynamic data. Additionally, to further add to the complexity of the application framework, data objects may be transmitted via multiple types of communication channels such as, for example, email, application portals, widgets, chat channels, application programming interface (API) calls, etc.

To manage the scale, numerosity, and/or complexity of the data objects, an application framework may store one or more portions of data objects and/or related data for an application component in a partition of a database designated for the application component. For example, an application framework typically utilizes a cell-based architecture for databases where data cells are typically inefficiently partitioned and are often comprised of data related to multiple components. A partition may be a logical boundary that defines which data hosted by an application component is to be stored therein. For example, a partition may store data objects of any particular metric or logic such as, for example, a particular type, origin, location, tenant, etc. In some examples, one or more partitions of a database may be interconnected via a partition set and one or more partition sets may be associated with one or more application components. For example, an application component may have a partition of a partition set allocated to the application component such that data objects with relation to the application component may be stored in the partition. In some examples, data objects related to the application component may be identified based on an identifier for the application component. In some examples, each application component can utilize a particular partition that is accessible based on an API request to receive data and/or an authentication protocol for the application component.

However, it may still be difficult for an application framework utilizing partition data structures to manage data objects given the complexity and scale of modern application frameworks. It may also be difficult to manage and optimize data requirements and/or computing resources related to application components of such application frameworks. Such application frameworks may also be unable to provide accurate and precise migration of data from a source partition to a destination partition during a data migration process associated with a database and/or related partitions. For example, it is typically difficult to ensure precise data migration associated with a partition when the source data is being written to and/or otherwise modified via one or more other create, read, update, and delete (CRUD) activities during a data migration process with respect to the partition and another partition. In a non-limiting example, consider a scenario in which it is desirable for Beta Corporation to manage collaborative portions of a service management process such as, for example, an information technology service management process (or another type of application component process) such that data associated with respective components are automatically processed, routed, and/or stored across databases. However, the services management processes and/or workflows may result in a vast and complex collection of data related to various services, resulting in difficulties for tracing data objects, inefficient usage of computing resources, and/or other technical drawbacks. Additionally, data associated with component processes and/or workflows may be dynamically modified in real-time during a data migration process associated with partitions configured to store the data, thereby increasing the likelihood of inaccurate and/or corrupted data for the component processes and/or workflows. Such inaccuracies and/or corrupted data may additionally result in additional security vulnerabilities, system downtimes, storage inefficiencies, increased power consumption, a decrease in computing performance, and/or other technical drawbacks for one or more databases (e.g., one or more databases related to the partitions with the inaccuracies and/or corrupted data), computing devices, virtual machines, server resources, machine learning models, and/or one or more other portions of the application framework.

To address the above-described challenges related to managing server systems and/or databases related to server systems, various embodiments of the present disclosure are directed to systems, apparatuses, methods, and/or computer program products for configuring a data partition based on one or more data ledgers associated with a data migration event. In various embodiments, one or more data ledgers may be utilized to record in-flight activities (e.g., CRUD operations, writes, bootstrap operations, etc.) occurring during a data migration event associated with a source partition. Additionally, the one or more data ledgers may be utilized to ensure that the in-flight activities are logged at a destination partition, confirmed as complete, and/or acknowledged as complete to facilitate accurate configuration of the destination partition. For example, the one or more data ledgers may be updated based on the in-flight activity associated with the data migration event such that one or more data objects of the destination partition is configured and/or the migration event is confirmed as being completed based on the in-flight activity. In various embodiments, configured data objects in the destination partition may be properly configured for processing via an application framework and/or one or more related computing tasks.

Accordingly, inaccuracies and/or corrupted data may be mitigated for a data partition by utilizing one or more data ledgers associated with a data migration event as disclosed herein. Additionally, by utilizing one or more data ledgers associated with a data migration event as disclosed herein, scalability, performance, and/or concurrency associated with a database system of an application framework may be provided. Therefore, quality and/or accuracy of data for a database system and/or data partition may be further improved. By utilizing one or more data ledgers associated with a data migration event as disclosed herein, computing resources and/or memory allocation with respect to processing and storage of data for the application framework may additionally or alternatively be improved. In doing so, various embodiments of the present disclosure make substantial technical contributions to improving the efficiency and/or the effectiveness of an application framework. Various embodiments of the present disclosure additionally or alternatively provide improved resiliency, management, and efficiency of database management, improved cross-product collaboration, improved scalability, improved service stability, improved usability, improved data quality, improved interactions, with respect to data related to an application framework. Additionally, by utilizing one or more data ledgers associated with a data migration event as disclosed herein, various embodiments of the present disclosure provide quality assurance for data partitions to enable confirmation of complete and accurate migration of data between data partitions.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "component" or "application component" refers to a computer functionality or a set of computer functionalities, such as the retrieval of specified information or the execution of a set of operations, with a purpose that different clients may reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications.

In some embodiments, a component may represent an operation with a specified outcome and may further be a self-contained computer program. In some embodiments, a component from the perspective of the client (e.g., another component, application, etc.) may be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service (e.g., a web service). Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework. The term "component object identifier" refers to one or more data items or elements by which a component object may be uniquely identified. The component object identifier may include, for example, one or more of Internet Protocol (IP) addresses associated with a component, Uniform Resource Locators (URLs) associated with a component, numerical characters, alphabetical characters, alphanumeric codes, American Standard Code for Information Interchange (ASCII) characters, encryption keys, identification certificates, the like, or combinations thereof. An example embodiment of a component object identifier may comprise data provided by at least a component author, for example, a URL and a payload associated with a component. In some embodiments, the payload comprises a JSON formatted text that is either posted, by way of an HTTP POST, to a component when a resource is created or returned from a component, through an HTTP GET, when at least a resource is requested from the component.

The term "application framework" refers to a computing environment associated with one or more computing devices and one or more components (e.g., one or more application components), where the environment enables interactions with respect to components supporting at least one application. For example, an application framework may be a system (e.g., a server system, a cloud-based system, an enterprise system, etc.) where multiple components, multiple resources associated with components, multiple layers of components, and/or multiple layers of resources interact with one another in several complex manners. In some embodiments, the components are associated directly or indirectly with an application supported by the components. In some embodiments, the components may support the application over one or more communication networks. The application framework may include one or more components to generate and update a repository of collected information for each component (e.g., an event object repository). Accordingly, the application framework may provide for the collection of information, in the form of event objects, to facilitate monitoring of event streams associated with one or more components of the application framework. In certain embodiments, the application framework may be configured as a collaborative application framework that manages one or more collaborative applications such as, for example, one or more collaborative document applications, collaborative software development applications, and/or one or more other types of collaborative applications. In certain embodiments, the application framework may be configured as an enterprise instance of a collaboration and knowledge base component platform for managing documents and/or encouraging collaboration among users. In certain embodiments, the application framework may be configured as a service management software platform. In certain embodiments, the application framework may alternatively be configured to manage one or more project management applications, one or more work management applications, one or more software development applications, one or more product development applications, one or more portfolio management applications, or one or more other types of applications. In certain embodiments, the application framework may be configured as an enterprise instance of an information technology service management software platform. However, it is to be appreciated that, in other embodiments, the application framework may be configured as another type of component platform.

The term "application framework system" refers to a system that includes both a server framework and a repository framework to support the server framework. For example, an application framework refers to a system that includes a computing environment associated with one or more computing devices and one or more components, as well as a repository of collected information for each component and/or each computing device.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application may be supported by one or more components either via direct communication with the component or indirectly by relying on a component that is in turn supported by one or more other components.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices. In some embodiments, a service may own resources, provide capabilities, and the like.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components may be collected and compiled into component objects which may also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more APIs. For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "repository" refers to a database, a datastore, and/or a memory device which is accessible by one or more computing devices for retrieval and storage of one or more data components, the like, or combinations thereof. The repository may be configured to organize data components stored therein in accordance with one or more particular data classification labels or other attributes attributed to the data component (e.g., a scoring metric, file size, file type, etc.). For example, a repository may be structured in accordance with one or more data components associated with one or more services, applications, data classification labels, internal resources, external resources, network functions, APIs, the like, or combinations thereof. In some embodiments, a repository may be at least partially stored on one or more of a server, remotely accessible by a computing device, or on a memory device on-board the computing device.

The term "data sharding" refers to a technique for segmenting and/or distributing data related to a component across two or more partitions. In some embodiments, data sharding may refer to database sharding with respect to a database and/or a datastore of an application framework system.

The term "event data object" refers to a data entity representative of raw data, arrays, logs, events, processes, operations, statuses, and the like, associated with a partition and/or a data migration event. For example, an event data object may represent data in transmission between partitions as a result of a data migration event. In another example, an event data object may represent metadata describing one or more processes occurring during or as a result of a data migration event. In another example, an event data object may represent a CRUD activity associated with a partition of a data migration event. In yet another example, an event data object may represent bootstrap activity associated with a process that iterates over respective data items in a partition such that the respective data items are transmitted to a destination partition independent of CRUD activity. In some embodiments, an event data object CRUD activity may only succeed if a data ledger or data ledger entry is created for the event data object CRUD activity at the same time. For example, creation of a data ledger or data ledger entry and the CRUD activity may be performed together transactionally. In some embodiments, transactions (e.g., database transactions) may be used to ensure change data capture (CDC) event data objects (e.g., CRUD activities) are tracked by a respective data ledger entry during a data migration event. For example, such data ledger entries may be used to provide increment completeness validation. In some embodiments, CDC event data objects are invisible while in an event data stream (e.g., a database event data stream, queue, or topic). In some embodiments, data ledger entries structurally guarantee visibility of such event data objects. Such visibility of event data objects may, in some examples, support iterative completeness handling and visibility of OLTP systems.

The term "data status information" refers to data or metadata describing a state or condition of a data entity. For example, data status information may indicate whether an event data object is in transmission, has been sent, received, created, deleted, processed, or the like. In another example, data status information may indicate whether a data ledger or data ledger entry has been created, deleted, processed, or the like.

The term "partition" refers to a collection of data that is stored in a database and/or a datastore of an application framework system. It is to be appreciated that the term "partition" may be interchangeably referred to herein as a "data partition." In some embodiments, a partition is a logical boundary that defines a collection of data hosted by a component of an application framework. In some embodiments, a partition may be a portion of a database allocated to a particular component of an application framework. Additionally, a partition may be used to store data or a subset of data. For example, a partition may store one or more data objects associated with a component. By way of example, a component storing data may split a large table of data into smaller tables of data, each smaller table containing some subset of the overall data referred to as a partition. In another example, a component may store frequently accessed information in one partition and store infrequently accessed information in another partition. In another example, a component may store information from one region in one partition and store information from another region in another partition.

In some embodiments, a partition may be associated with a component object identifier such as a partition identifier. A partition identifier may, for example, include a defined format. In some embodiments, a partition identifier may be used in an API call or other network communication to a component of an application framework to read or write some data stored within the respective partition. In some embodiments, a partition may be associated with a data migration event. For example, in a data migration event, the data stored in one partition may be copied or transmitted to another partition. In some embodiments, a partition associated with a data migration event may be a source partition or a destination partition. For example, a data migration event may include copying or transmitting data from a source partition to a destination partition.

In some embodiments, one or more actions may be performed with respect to a source partition such as, for example, create, read, and complete. In some examples, one or more data ledgers and/or data ledger entries associated with a source partition may be utilized, to confirm existence of data stored in a source partition, process or update information stored in one or more data ledgers associated with a source partition, and the like. In some embodiments, data stored at a source partition can act as a failsafe in the event of errors. For example, in the case of an error where there are many deal-letter queue (DLQ) messages without a corresponding data ledger for the destination partition, the data associated with the DLQ messages may still be safely stored at the source partition. Additionally, data ledger entries may still exist in data ledgers at the source partition region. Using the source partition and the data ledgers of the source partition region, the DLQ messages may be resolved. In some embodiments, one or more actions may be performed with respect to a destination partition such as, for example, read and complete. In some examples one or more data ledgers and data ledger entries associated with a destination partition may be utilized to confirm existence of data stored in a destination partition, process or update information stored in one or more data ledgers associated with a destination partition, and the like.

The term "partition activity information" refers to a data operation associated with a partition. For example, partition activity information may refer to a CRUD activity associated with a source partition and/or a destination partition. In another example, partition activity information may refer to bootstrap activity associated with a source partition and/or a destination partition.

The term "data status information" refers to data or metadata describing a state or condition of a data entity. For example, data status information may indicate whether an event data object is in transmission, has been received, created, deleted or the like. In another example, data status information may indicate whether a data ledger or data ledger entry has been created, deleted, or the like.

The term "data migration event" refers to a copying or transmitting of data from a first partition to a second partition that serves to replicate the operational state, architecture, and stored data of the first partition. In some embodiments, a second partition of a data migration event may be configured to copy the data stored in a first partition such that the stored data in the second partition may be accessed to support functions of an associated software application when the first partition is offline or otherwise no longer accessible. In some embodiments, a first partition of a data migration event is a source partition, and second partition of a data migration event is a destination partition. In some embodiments, a data migration event may be related to data migration activity and/or a workflow associated with a partition. For example, a data migration event may be related to CRUD activity such as, but not limited to, a create action, a read action, an update, a delete action, or a write action with respect to a partition. In another example, a data migration event may be related to bootstrap activity that is independent of CRUD activity with respect to a partition. For instance, bootstrap activity may occur in response to a data migration request that is distinct from CRUD activity with respect to a partition. In some embodiments, bootstrap activity may be associated with a process that iterates over respective data items in a partition such that the respective data items are transmitted to a destination partition independent of CRUD activity.

The term "data migration activity information" refers to information associated with activities, operations, tasks, processes and the like associated with a data migration event. For example, data migration activity information may include information associated with transmitting, copying, deleting, and the like, of data or data entities (e.g., event data objects, data ledgers, data ledger entries, partitions) associated with a data migration event.

The term "data ledger" refers to a data entity configured to perform record keeping for data entities associated with a data migration event. For example, a data ledger may be a global ledger, distributed ledger system, or the like, containing data ledger entries configured to store information associated with event data objects, partitions, data status information, data migration activity information, and the like. Additionally, a data ledger may be configured as a data ledger table configured to store the information associated with event data objects, partitions, data status information, data migration activity information, and the like. In some embodiments, data ledgers may be associated with a source partition and/or destination partition. In some embodiments, data ledgers may be associated with a region of a source partition and/or destination partition. In some embodiments, entries in the data ledger may be created, read, or completed. For example, data ledger entries may be written, read to confirm existence, processed, created, deleted, deleted and created, or the like. In some embodiments, data ledger entries may not be changed (i.e., data ledger entry contents are treated as immutable) but data ledger entries themselves may be changed (i.e., data ledger entries themselves may be created and deleted, but not updated). In some embodiments, data ledgers may be structurally guaranteed to exist for each event data object of a partition associated with a data migration event to enable an online transaction processing (OLTP) speed query to indicate any event data objects that have yet to be processed (e.g., to provide increment completeness checking).

In some embodiments, data ledgers are used as a tracking mechanism to track outstanding event data objects that are, for example, buried in an simple queue service (SQS) queue, simple notification service (SNS) topic, CDC event stream, or the like, where there is no way to programmatically query for the event data object's existence, or where information of the event data object may be partially available from different sources where there are consistency challenges. For example, data ledgers may track event data objects such as an SNS message in a topic waiting to be delivered, an SQS message sitting in a queue waiting to be delivered, a CDC event in an event data stream for a database, partition information in a distributed multi-layer cache (in memory and secondary cache), or the like. In some embodiments, a data ledger entry is a tracking record tied to a data object (e.g., an event data object) as an indicator of pending work associated with the event data object. In some embodiments, a data ledger entry may contain a small amount of immutable data once the data ledger entry is created. In some embodiments, data ledgers/data ledger entries may be queried (e.g., via an API call) to determine information associated with a process tracked by the data ledger (e.g., a data migration event) to trigger an alert to an entity (e.g., a system administrator, operations engineer, etc.).

In some embodiments, data ledger entries are used to track partitions as associated with a data migration event. For example, such data ledger entries may be used to avoid distributed cache invalidation issues. In some embodiments, during a data migration event, all CDC events may be tracked by a data ledger to provide increment completeness validation.

In some embodiments, data ledgers may be associated with different types of data migration activity. For example, different data migration activity may include, but is not limited to, indication that a partition is migrating, that a data migration event has failed with respect to a particular partition, that there is work taking place to identify event data objects within the partition and load and process the event data objects to be migrated (e.g., a bootstrapping process), that a bootstrapping process for a partition is complete, that a bootstrapping process for a partition has failed, that an event data object (e.g., from a bootstrapping process or CDC process) has been transmitted for migration, that an event data object (e.g., from a bootstrapping process or CDC process) has failed to be transmitted for migration, that an event data object has been processed by a bootstrap process and is waiting to be acknowledged as received by a destination partition, that an event data object has been processed by a CDC process and is waiting to be acknowledged as received by a destination partition, or the like.

In some embodiments, creating a data ledger may be idempotent. For example, in instances where the same conditions or criteria are present when creating a data ledger or data ledger entry, the outcome should be the same. In some embodiments, if a call requests that a data ledger be created when the data ledger already exists, the request may be returned as successful. In some embodiments, if a call requests that a data ledger be created and the data ledger does not exist, the data ledger may be created in response.

In some embodiments, querying for the existence of a data ledger associated with processes or event data objects may be performed as strongly consistent reads by the source partition. For example, using a strongly consistent read for these types of queries in the source partition reduces complexity by removing the need to pair an eventually consistent read with at least one other confirmation mechanism.

In some embodiments, querying for completeness of data ledgers associated with processes may be performed transactionally (e.g., to avoid where only some of the required actions are done before some failure point occurs). For example, such querying may be triggered by orchestration or choreography processing a data migration event and must actively handle eventual consistencies. In some embodiments, a data ledger for a process data migration activity type may be required to always indicate that the process is ongoing, complete, or failed. For example, if a data ledger is expected (e.g., for some create/delete request) but does not exist, and a call has been made to create the data ledger (and is in processing), being able to check the durable side effect of the call (i.e., that it is in processing) may allow systems to avoid continual redeliveries and retry failures. In another example, if a data ledger is expected and a durable side effect of the data ledger does not exist, an associated request may be considered unserviceable and may be retried until success or retry failure is achieved. If a retry failure is achieved, in some embodiments, a service representative (e.g., a system administrator, operations engineer, etc.) may be summoned to investigate and process or restart events as necessary.

In some embodiments, querying for completeness of data ledgers associated with event data objects may be performed as a group or transactionally as a set of updates that occur together (or not at all to cause redelivery or failure). For example, such querying may be triggered by the receipt and processing of event data objects by a destination partition and must actively handle eventual consistency. In some embodiments, if a ledger that is expected does not exist on receipt of a migration payload (e.g., a plurality of event data objects of a data migration event), the request may be considered unserviceable and may be retried until success or retry failure is achieved. If a retry failure is achieved, in some embodiments, a servicing entity (e.g., a system administrator, an operations engineer, etc.) may be summoned to investigate and process or restart events as necessary.

The term "partition key" refers to a data entity that may serve as a primary key or part of a composite primary key for a data table or data entity. For example, a partition key may be a unique identifier that is used to reference an entry of a data table where the primary key of the data table is the partition key. In another example, a partition key may be a unique or non-unique identifier that is used to reference an entry of a data table where the composite primary key of the data table includes the partition key.

In some embodiments, a partition key is constructed to enable direct query-ability without needing global secondary indexes. In some embodiments, partition keys are constructed to scale linearly with other associated systems (e.g., a key-value database). In some embodiments, entries of a data ledger use constructed keys, such as partition keys, so that trackable entities (e.g., event data objects) only map to a single data ledger partition key and sort key combination for a given activity (e.g., CRUD activity). For example, creation of partition keys and sort key combinations for trackable entities must be idempotent. In some embodiments, different versions of trackable entities may map to different partition key and sort key combinations for a given activity. In some embodiments, any given data ledger entry may be configured to use sufficiently constructed partition key and sort key values to scale linearly with associated systems (e.g., a key-value database) in order to support both direct access and queries from such associated systems.

In some embodiments, across different data ledger types, partition keys may generally use the same constructed format. In some embodiments, a partition key may use a constructed format that includes, for example, a data migration activity type, a partition identifier, and a partition suffix, or some other constructed format. In some embodiments, data ledger partition keys may be constructed in conjunction with suffixes to ensure that uses and implementations are consistent across systems. In some embodiments, data ledger partition keys may be constructed to provide sufficient key space for scaling. For example, suffixing partition keys may be used in response to volume changes (e.g., dramatic increases).

The term "sort key" refers to a data entity that may serve as a key (e.g., as part of a composite primary key) for a data table or data entity. For example, a sort key may be used to reference an entry of a data table where a composite primary key of the data table includes a partition key and a sort key. In some embodiments, a partition key and a sort key may be used in combination to form a primary key. For example, if a partition key is not unique, for example, in a data table, a sort key may be used in combination with the partition key so that each entry in the data table has a unique combination of partition key and sort key.

In some embodiments, across different data ledger types, sort keys may generally use different constructed formats. In some embodiments, a sort key may use a constructed format that is, for example, identical to an associated partition key, a constructed format that includes an event data object hash key and an event data object version, or some other constructed format. In some embodiments, an event data object hash key may use a constructed format that, for example, includes a partition identifier, a schema type, and an event data object identifier, or some other constructed format. In some embodiments, a sort key is identical to a partition key when the sort key is not used. For example, if expected volumes are low, a sort key may be set to the partition key as it is not needed. In some embodiments, if volumes change (e.g., dramatically increase), a sort key may be set so the sort key is different than the partition key and may be used.

The term "transmission mechanism" refers to a system configured to transmit data, event data objects, messages, notifications, calls, requests, and the like, between entities. As used herein, with respect to a transmission mechanism, the term "message" may refer to any data entity being transmitted by the transmission mechanism such as, for example, an event data object.

In some embodiments, a transmission mechanism may refer to SNS, SQS, DLQ, or the like. In some embodiments, event data objects may be published to one or more transmission mechanism for transmission, distribution, and the like. For example, an event data object may be published to a transmission mechanism to be provided to a destination partition. In some embodiments, transmission mechanisms may guarantee cross region delivery of messages. For example, transmission mechanisms may provide retry and error messages if a message cannot be processed. In some embodiments, transmission mechanisms may be responsible for providing messages and message attributes to appropriate destinations by, for example, routing to the correct destination based on message attributes and routing information of the message. In some embodiments, event streams may be used to guarantee that, for example, each CDC event data object for a partition associated with a data migration event may be queued for publishing to a transmission mechanism.

In some embodiments, each event data object may have a cyclic redundancy check (CRC), hash, or the like calculated for the event data object before being published to a transmission mechanism, which may also be sent as a message attribute to provide, for example, incremental correctness checking. In some embodiments, a data ledger and/or data ledger entry is written for every event data object before being published to a transmission mechanism (e.g., as part of a bootstrap process in order to provide incremental completeness tracking and OLTP speed querying to indicate whether bootstrap processing is complete).

In some embodiments, each message's CRC, hash, or the like may be validated upon receipt. If the validation fails, the message may be rejected for processing. In some embodiments, messages received from a transmission mechanism (e.g., bootstrap or CDC event data objects) received at a destination partition may only be processed once a corresponding data ledger entry for the message is consistent in a data ledger associated with the destination partition (e.g., to provide incremental completeness tracking).

The term "transmission mechanism information" refers to data or metadata associated with a transmission mechanism. For example, transmission mechanism information may refer to SNS messages, SQS messages, DLQ messages, or the like. In some embodiments, event data objects are provided to transmission mechanisms.

The term "routing" refers to an action and/or transmission of data such as, for example, a data object via a communication channel, path or mapping used to propagate the data between applications, components, databases, partitions, and/or the like. In various embodiments, routing may be based on one or more routing criteria related to an application framework system and/or a communication channel. Managing routing decisions may ensure consistency on how the appropriate components, partitions, partition sets, and the like are used when making calls or requests within an application framework. For example, in a data migration event, routing information can be determined to transmit event data objects from a source partition to a destination partition. In some embodiments, routing information may be predetermined. In other embodiments, routing information may be determined dynamically at runtime. In some embodiments, routing information may include information related to the source or target of a request, resources related to the request, headers and/or attributes associated with the request, identifiers associated with the request, and the like. In some embodiments, event data objects, calls, messages, requests, and the like may be required to include routing information that includes or maps to information such as a partition identifier, partition key, data ledger, or the like.

The term "manage" with respect to a data entity such as an event data object, partition, data ledger, data ledger entry, or the like, refers to one or more actions performable for altering the data object and/or information therein. Non-limiting examples of actions for managing a data object include deleting a data object, creating a data object, editing a portion of information embodied by and/or otherwise stored in a data object, altering the state of a data object, and/or altering access to a data object.

The term "region" represents a physical location which may host resources and components. In some embodiments, a region is mapped to a particular region supported by, for example, AWS or another cloud computing or server system.

The term "interaction signal" refers to a signal received by one or more computing devices (e.g., servers, systems, platforms, etc.) which are configured to cause an application framework system to perform one or more actions associated with one or more components of the application framework system. The interaction signal may be received via a component management interface, an API, a communication interface, the like, or combinations thereof. In one or more embodiments, the interaction signal may be generated by a client device via one or more computer program instructions. In various embodiments, an interaction signal may be generated via a collaborative application, event, event stream, or the like. Additionally or alternatively, the interaction signal may cause one or more actions, one or more changes, and/or one or more predictive inferences with respect to a collaborative application, event, event stream, or the like.

The term "interface element" refers to a rendering of a visualization and/or human interpretation of data associated with an application framework and/or a distributed ledger system. In one or more embodiments, an interface element may additionally or alternatively be formatted for transmission via one or more networks. In one or more embodiments, an interface element may include one or more graphical elements and/or one or more textual elements.

The term "visualization" refers to visual representation of data to facilitate human interpretation of the data. In some embodiments, visualization of data includes graphic representation and/or textual representation of data.

The term "graphical control element" refers to a computer input element that allows a user to enter input to facilitate one or more actions with respect to an application framework.

The term "interface area" refers to an area of an electronic interface, where the area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a graphical control element and/or one or more other interactive interface elements.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a PDA, mobile telephone, smartphone, laptop computer, tablet computer, wearable, the like or any combination of the aforementioned devices.

FIG. 1 illustrates an example system architecture 100 within which embodiments of the present disclosure may operate. The system architecture 100 includes an application framework system 105 configured to interact with one or more client devices 102*a*-*n*, such as client device 102*a*, client device 102*b*, and/or client device 102*n*. In one or more embodiments, the one or more client devices 102*a*-*n* may be configured to interact with one or more components managed by an application framework 106 of the application framework system 105. For example, in one or more embodiments, the one or more client devices 102*a*-*n* may be configured to send data to the one or more components managed by the application framework 106 and/or receive data from the one or more components managed by the application framework 106. In one or more embodiments, the one or more components may interact with one another in several complex manners to provide collaborative applications and/or collaborative services.

In one or more embodiments, the application framework system 105 includes a database system 107 associated with one or more databases 109. The one or more databases 109 may store data associated with one or more components managed by the application framework 106. For example, the database system 107 may store data for one or more component objects and component object dependencies in one or more databases 109. The one or more databases 109 may be configured to support data sharding. For example, a database 109 of database system 107 may include one or more partition sets, such as multiple distributed partition sets that are connected through a computer network. Each partition set may include one or more partitions configured to store at least one of one or more data assets and/or one or more data about the computed properties of one or more data assets. Moreover, each partition set in the database system 107 may include one or more non-volatile storage or memory media including but not limited to hard disks, ROM, PROM, EPROM, EEPROM, flash memory, MMCs, SD memory cards, memory sticks, CBRAM, PRAM, FcRAM, NVRAM, MRAM, RRAM, SONOS, FJG RAM, Millipede memory, racetrack memory, the like, or combinations thereof.

In some embodiments, the database system 107 may include one or more databases 109 associated with one or more partition sets containing one or more partitions associated with one or more component objects and component object dependencies. In some embodiments, the data included in database system 107 is distributed to the one or more partitions. For example, the data of the one or more databases 109 may be stored into one or more partitions associated with one or more partition sets. In one or more embodiments, the application framework system 105 additionally includes one or more data ledgers 111.

The system architecture 100 also includes a data ledger apparatus 120. In an embodiment, the data ledger apparatus 120 is implemented separate from the application framework system 105. Alternatively, in certain embodiments, the application framework system 105 may include the data ledger apparatus 120. In various embodiments, the application framework system 105 and/or the data ledger apparatus 120 may also be configured to interact with the one or more client devices 102*a-n*. In various embodiments, the data ledger apparatus 120 may be configured to interact with application framework system 105. For example, in one or more embodiments, the data ledger apparatus 120 may be configured to interact with and/or manage one or more components of the application framework 106 and/or one or more databases 109 of the database system 107. In one or more embodiments, the data ledger apparatus 120 may be configured to interact with and/or manage the one or more data ledgers 111. In some embodiments, the data ledger apparatus 120 is configured to manage one or more partitions of the one or more databases 109 based on the one or more data ledgers 111. In some embodiments, the data ledger apparatus 120 is configured to manage data stored in one or more partitions associated with the one or more databases 109 based on the one or more data ledgers 111. For example, in some embodiments, the data ledger apparatus 120 is configured to manage data stored in one or more partitions associated with the one or more databases 109 based on data migration activity stored in the one or more data ledgers 111. In some embodiments, the data ledger apparatus 120 configures one or more partitions associated with the one or more databases 109 based on one or more of the one or more data ledgers 111 associated with a particular data migration event associated with one or more other partitions associated with the one or more databases 109.

The application framework system 105, the data ledger apparatus 120, and/or the one or more client devices 102*a-n* may be in communication using a network 104. Additionally or alternatively, in various embodiments, the application framework system 105 and the data ledger apparatus 120 may be in communication via a backend network and/or an enterprise network separate from the one or more client devices 102*a-n*. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102*a-n* may include a mobile device, a smart phone, a tablet computer, a laptop computer, a wearable device, a personal computer, an enterprise computer, a virtual reality device, or another type of computing device. In one or more embodiments, a client device from the one or more client devices 102*a-n* includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

In one or more embodiments, the application framework system 105 may be configured to receive one or more interaction signals from one or more of the client devices 102*a-n*. An interaction signal refers to a signal configured to cause one or more actions with respect to the application framework 106. For example, an interaction signal may be a signal configured to cause one or more actions with respect to one or more computing devices and or one or more components managed by the application framework 106. An interaction signal may be generated by the one or more client devices 102*a-n* and may be received via a component management interface of the application framework 106, an API of the application framework 106, a communication interface of the application framework 106, the like, or combinations thereof. Based on the one or more interaction signals, the application framework system 105 may perform one or more actions with respect to the application framework 106. In various embodiments, the one or more actions may be associated with one or more user identifiers associated with one or more events with respect to one or more components of the application framework 106. For example, the one or more actions may initiate and/or correspond to one or more events with respect to one or more components of the application framework 106. In certain embodiments, the one or more actions may be associated with one or more events with respect to a one or more computing devices and or one or more components managed by the application framework 106. In certain embodiments, the one or more actions may be associated with one or more user identifiers with respect to one or more computing devices and or one or more components managed by the application framework 106.

In some embodiments, the data ledger apparatus 120 may manage and/or configure one or more components of the application framework system 105, one or more databases 109 of the database system 107, and/or the one or more data ledgers 111. In one or more embodiments, the data ledger apparatus 120 may allocate one or more partitions of a partition associated with a database 109 to a component of the application framework 106 based on the one or more data ledgers 111. In one or more embodiments, the data ledger apparatus 120 may determine and/or perform routing associated with a database 109 and/or a component of the application framework 106 based on the one or more data ledgers 111. In one or more embodiments, the data ledger apparatus 120 may manage a component and/or database 109 of the application framework 106 based on the one or more data ledgers 111.

Figure 2:
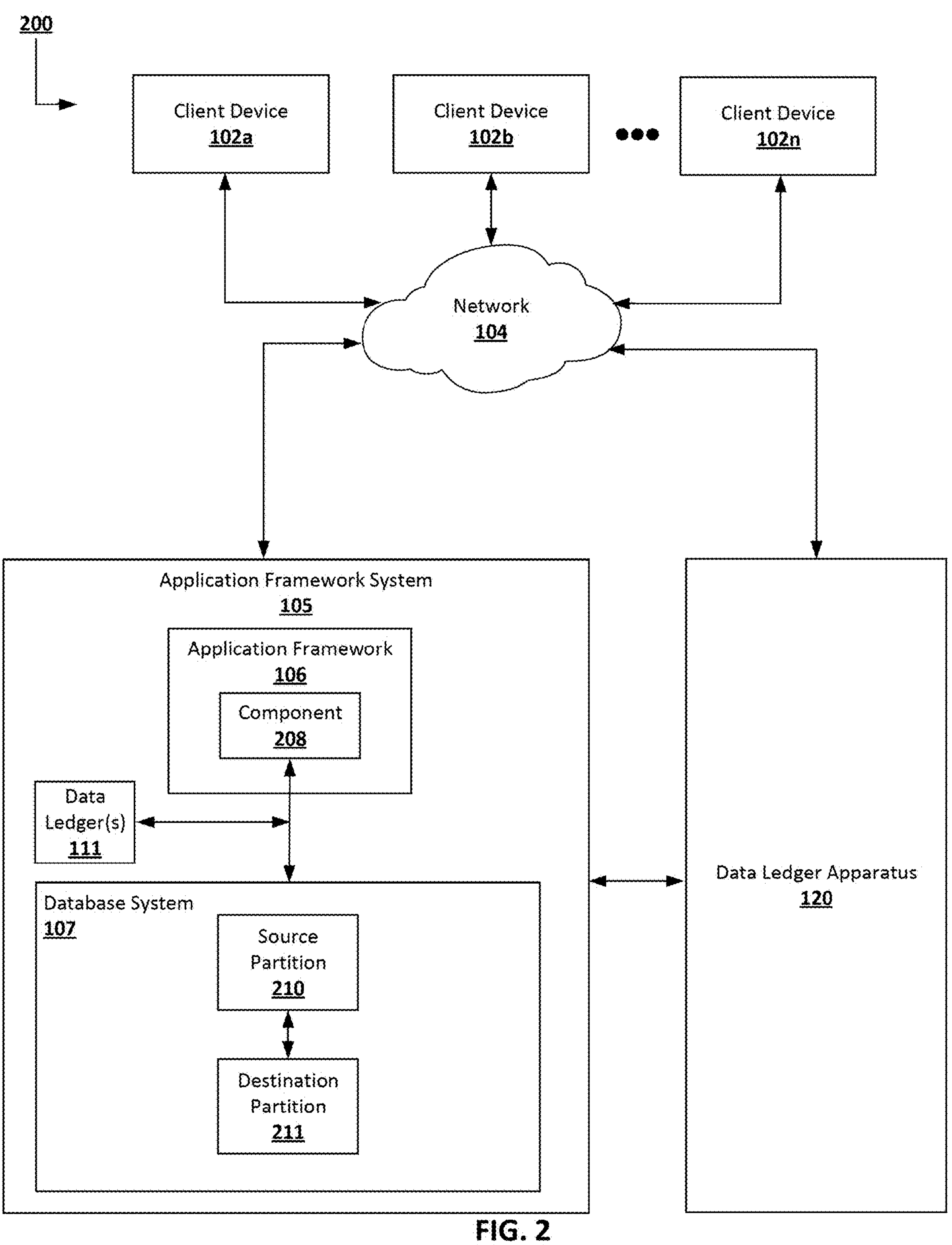
FIG. 2 is a block diagram of another example system within which one or more embodiments of the present disclosure may operate.

FIG. 2 illustrates an example system architecture 200 within which embodiments of the present disclosure may operate. The system architecture 200 includes the application framework system 105, application framework 106, database system 107, one or more data ledgers 111, client devices 102*a-n*, network 104, and data ledger apparatus 120. In one or more embodiments, the application framework 106 includes a component 208. For example, the component 208 may be a component (e.g., an application component or an application service) offered by application framework 106. In one or more embodiments, the component 208 is associated with the database system 107 (e.g., the one or more databases 109 of database system 107). The database system 107 (e.g., the one or more databases 109 of database system 107) may be associated with a plurality of partitions such as, for example, at least a source partition 210 and a destination partition 111. For example, data associated with component 208 may be stored in the source partition 210 and/or destination partition 111 of the database system 107.

In various embodiments, the data ledger apparatus 120 is communicatively coupled to the application framework system 105 and/or the database system 107 for direct management of the application framework system 105 and/or the database system 107. For example, the data ledger apparatus 120 may be configured to allocate the source partition 210 and/or destination partition 111 to the component 208 of application framework 106. Additionally, the data ledger apparatus 120 may be configured to manage, authorize access, update, delete, merge, duplicate, and/or the like with respect to the source partition 210 and/or destination partition 111 of the database system 107.

In some embodiments, the data ledger apparatus 120 may be configured to manage the database system 107 (e.g., the one or more databases 109 of database system 107) based on the source partition 210 and/or destination partition 111. For example, the data ledger apparatus 120 may manage data access requests, data modification requests, CRUD requests, and/or event data objects associated with the database system 107 based on the source partition 210 and/or destination partition 111. In some embodiments, the data ledger apparatus 120 is configured to manage data migration activity information associated with the source partition 210 and/or destination partition 111 by utilizing the one or more data ledgers 111. For example, the data ledger apparatus 120 may update data migration activity information stored in the one or more data ledgers 111 based on data migration events associated with the source partition 210 and/or destination partition 111. In some embodiments, the data ledger apparatus 120 may be configured to manage the component 208, for example, by authorizing modification of data associated with component 208 based on data migration activity information stored in the one or more data ledgers 111.

Figure 3:
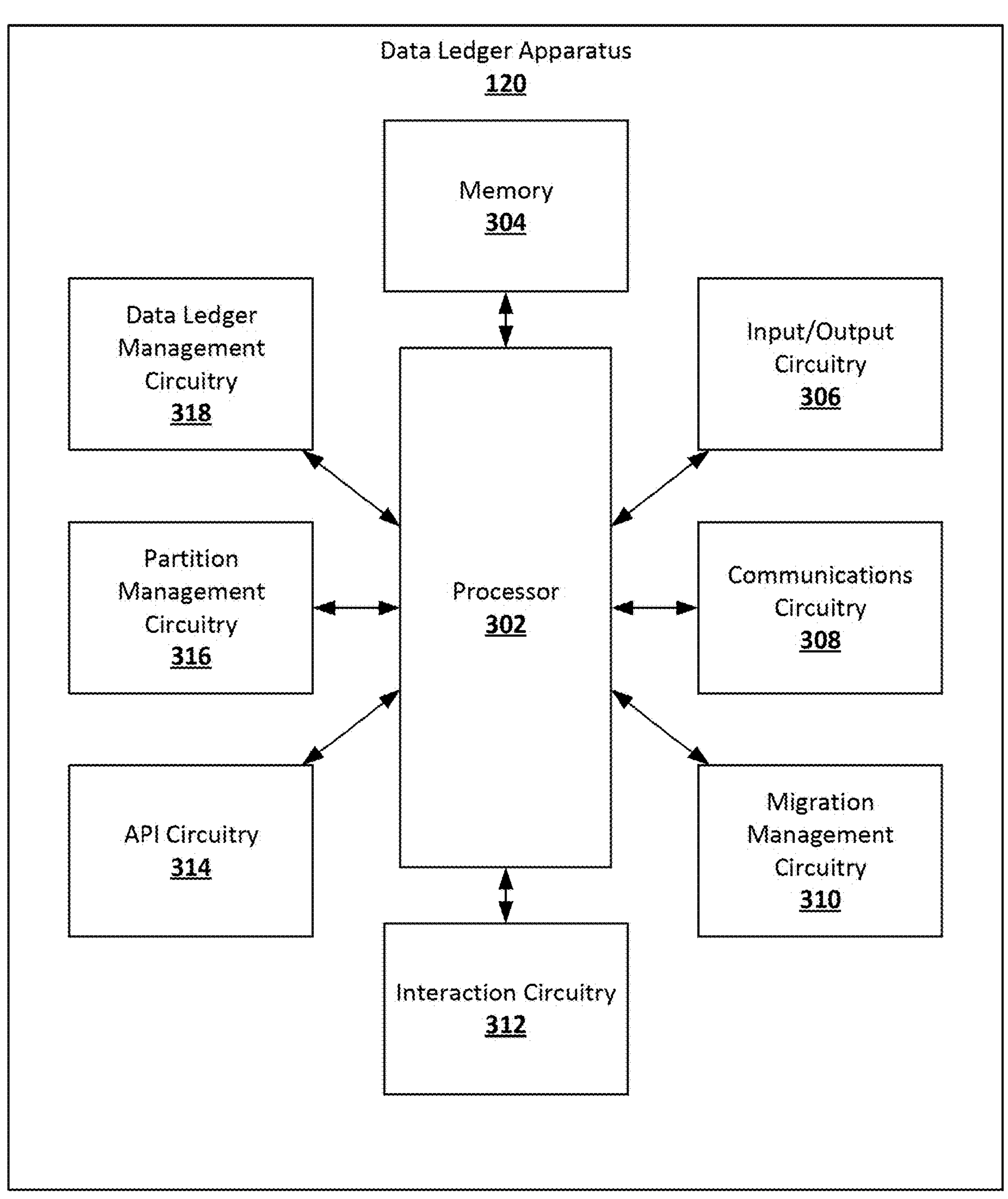
FIG. 3 is a block diagram of an example data ledger apparatus configured in accordance with one or more embodiments of the present disclosure.

The data ledger apparatus 120 may be embodied by one or more computing systems, such the data ledger apparatus 120 illustrated in FIG. 3. In one or more embodiments, the data ledger apparatus 120 may include processor 302, memory 304, input/output circuitry 306, communications circuitry 308, component routing circuitry 310, interaction circuitry 312, API circuitry 314, partition management circuitry 316, and/or data ledger management circuitry 318. The data ledger apparatus 120 may be configured to execute the operations described herein. Although these components 302-318 are described with respect to functional limitations, it should be understood that the particular implementations necessarily include the use of particular hardware. It should also be understood that certain of these components 302-318 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

In some embodiments, the data ledger apparatus 120 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the data ledger apparatus 120. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The component routing circuitry 310 may be any means such as a device or circuitry embodied in either hardware or a combination of hardware and software that is configured to interact with components of the application framework 106. In some embodiments, the component routing circuitry 310 may act as an intermediary for one or more components of an application framework. For example, the component routing circuitry 310 may receive and process requests, call, messages, and the like for one or more components of the application framework 106. In some embodiments, the component routing circuitry 310 may support data routing, traffic control, security, optimization, and/or the like for component 208 of application framework 106. For example, component routing circuitry 310 may receive a request and perform one or more subsequent actions based on the request. In some embodiments, component routing circuitry 310 may provide functionality of a service proxy for one or more components of the application framework 106.

In some embodiments, the database system 107 may comprise one or more of a single unified repository, a single partitioned repository, or a plurality of isolated repositories comprising one or more partitions. An example embodiment of database system 107 may comprise separate partitions 211*a-n* for isolating information for respective component identifiers. The interaction circuitry 312 may also be configured to generate access logs and/or historical data including information associated with a particular computing device, component, component object, the like, or combinations thereof.

In some embodiments, the database system 107 includes existing databases containing relationship data. In some embodiments, the one or more databases 109 of the database system 107 are specific to a component of the application framework system 105 and do not contain relationships across multiple components. In some cases, the one or more databases 109 of the database system 107 are shared across multiple components of the application framework. For example, a first component may be associated with a first partition of a database 109 and a second component may be associated with a second partition of the same database 109. In such a case, component routing circuitry 310 may be used to determine appropriate routing between the components and their respective partitions of the one or more databases 109. In one or more embodiments, the component routing circuitry 310 is configured to connect data across a plurality of components of the application framework system 105.

The interaction circuitry 312 may be any means such as a device or circuitry embodied in either hardware or a combination of hardware and software that is configured to interact with the application framework system 105 and/or the one or more client devices 102*a-n*. In various embodiments, the interaction circuitry 312 may monitor, analyze, and/or process data associated with the application framework system 105 such as, for example, data stored in the database system 107 and/or data related to a collaborative application. For example, in various embodiments, the interaction circuitry 312 may monitor event streams associated with the application framework 106 to detect respective candidate actions related to components of the application framework 106. In certain embodiments, the interaction circuitry 312 may be configured to retrieve metadata associated with the application framework 106 and/or the database system 107 to facilitate detection of respective candidate actions related to components of the application framework 106. The metadata may include, for example, data associated with relationships, sources, targets, ownership, consumption, libraries, activities, attributes, incidents, communication channels, dashboards, data repositories, labels, descriptions, and/or other data related to the application framework 106 and/or the database system 107.

In some embodiments, to facilitate monitoring of event streams, the communications circuitry 308 may be configured to ping one or more computing devices of the application framework 106, such as via an internet control message protocol, to receive information related to one or more components of the application framework 106. In some embodiments, to obtain event objects associated with the one or more components, the communications circuitry 308 utilizes the communications circuitry 308 to transmit one or more API calls to one or more API servers associated with the noted client devices.

The API circuitry 314 may be any means such as a device or circuitry embodied in either hardware or a combination of hardware and software that is configured to manage operations of various embodiments described herein. In various embodiments, the API circuitry 314 may be configured to interact with the application framework 106 and/or the data ledger apparatus 120. For example, the API circuitry 314 may be configured to manage the lifecycle of various components of the application framework 106. Additionally or alternatively, the API circuitry 314 may be configured to retrieve metrics related to the resources consumed by partitions of the database system 107. Additionally or alternatively, the API circuitry 314 may be configured to support partition management and may be utilized by one or more other circuitries of the data ledger apparatus 120 to create a partition, delete a partition, migrate a partition between components of the application framework 106, and or the like.

The partition management circuitry 316 may be any means such as a device or circuitry embodied in either hardware or a combination of hardware and software that is configured to generate and manage a partition set and/or partition of a database system 107. For example, partition management circuitry 316 may be configured to generate, merge, migrate, duplicate, delete, update, and/or the like, a partition of a partition set. In some embodiments, partition management circuitry 316 is configured to call a control-plane API to perform one or more operations associated with the partition management circuitry 316. In some embodiments, the partition management circuitry 316 may be any means such as a device or circuitry embodied in either hardware or a combination of hardware and software that is configured to manage data stored in the source partition 210 and/or the destination partition 211. In some embodiments, the partition management circuitry 316 may be any means such as a device or circuitry embodied in either hardware or a combination of hardware and software that is configured to monitor an event stream that includes one or more event data objects or a plurality of event data objects associated with a partition set and/or partition of a database system 107. For example, the partition management circuitry 316 may be any means such as a device or circuitry embodied in either hardware or a combination of hardware and software that is configured to monitor an event stream that includes one or more event data objects or a plurality of event data objects associated with the source partition 210 and/or the destination partition 211.

The data ledger management circuitry 318 may be any means such as a device or circuitry embodied in either hardware or a combination of hardware and software that is configured to manage data stored in the one or more data ledgers 111 associated with the application framework 106. For example, in one or more embodiments, the data ledger management circuitry 318 may detect an event data object associated with a data migration event. The data migration event may be indicative of data stored in a first partition (e.g., the source partition 210) associated with the event data object being migrated to a second partition (e.g., the destination partition 211) that is different than the first partition. In one or more embodiments, the data ledger management circuitry 318 may additionally or alternatively update one or more of the one or more data ledgers 111 associated with the data migration event based at least in part on the event data object. For example, the one or more updated data ledgers (e.g., one or more of the one or more data ledgers 111) may be configured to store data migration activity information associated with the first partition (e.g., the source partition 210), the second partition (e.g., the destination partition 211), and/or the event data object. In some embodiments, the partition management circuitry 316 may additionally configure the second partition (e.g., the destination partition 211) based at least in part on the data migration activity information stored in the one or more updated data ledgers (e.g., one or more of the one or more data ledgers 111).

In some embodiments, one or more external systems (such as a remote cloud computing and/or data storage system) may also be leveraged to provide at least some of the functionality discussed herein.

Figure 4:
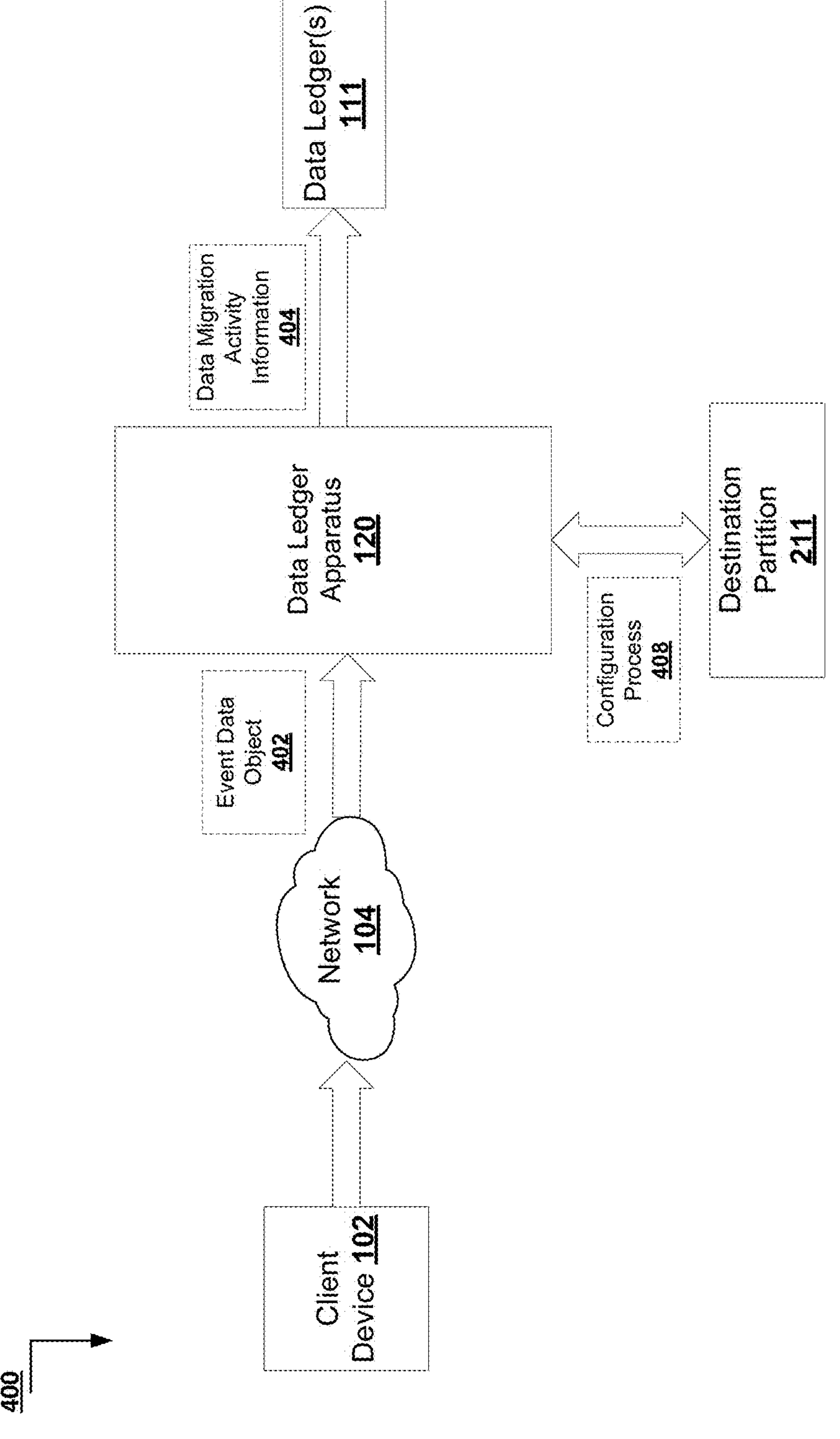
FIG. 4 illustrates an example data flow related to a data ledger apparatus in accordance with one or more embodiments of the present disclosure.

Referring to FIG. 4, an example data flow 400 is presented in accordance with one or more embodiments of the present disclosure. The data flow 400 depicts functionality between various sub-systems of the present disclosure, including the client device 102, the network 104, the data ledger apparatus 120, data ledger 111, and/or the destination partition 211. In one or more embodiments, the data flow 400 may be associated with a process for configuring a data partition (e.g., the destination partition 211) of the database system 107 based on the one or more data ledgers 111 and an associated data migration event. In one or more embodiments, the data ledger apparatus 120 may receive and/or detect an event data object 402 associated with the client device 102. In some embodiments, the event data object 402 may be received via the network 104 and/or from the client device 102. In some embodiments, the data ledger apparatus 120 may detect the event data object 402 by monitoring an event stream comprising a plurality of event data objects associated with the network 104. The event data object 402 may be associated with a data migration event. The data migration event may be indicative of data associated with the event data object 402 and stored in the source partition 210 being migrated to the destination partition 211. In some embodiments, the event data object 402 may be included in or otherwise associated with interaction signal. In some embodiments, the event data object 402 may be generated via a graphical control element of an electronic interface of the client device 102.

In one or more embodiments, the data ledger apparatus 120 may determine that the one or more data ledgers 111 is configured for monitoring a particular type of data migration event that corresponds to the data migration event associated with the event data object 402. In some embodiments, the data ledger apparatus 120 may receive an API request associated with the data migration event via the network 110. For example, the API request may be generated by the client device 102. In some embodiments, the event data object 402 is included in or otherwise associated with the API request. Additionally, the data ledger apparatus 120 may query a set of data ledgers based at least in part on the API request to determine the one or more data ledgers 111 associated with the data migration event. For example, the set of data ledgers may include the one or more data ledgers 111 and one or more other data ledgers associated with different respective data migration events. In some embodiments, the data ledger apparatus 120 may generate an alert based at least in part on a result of the query. Additionally or alternatively, the data ledger apparatus 120 may initiate a rendering of data associated with the alert via a display of the client device 102 associated with the API request.

The data ledger apparatus 120 may additionally or alternatively update the one or more data ledgers 111 associated with the data migration event based on the event data object 402. For example, the one or more data ledgers 111 may be configured to store data migration activity information 404 associated with the source partition 210, the destination partition 211, and/or the event data object 402. In various embodiments, the data migration activity information 404 may include in-flight activities such as, for example, writes, modifications, augmentations, replacements, deletions, mergers, CRUD activities, bootstrap activities, and/or the like associated with data stored in the source partition 210 and/or the destination partition 211. In a non-limiting example, the data migration activity information 404 may include partition activity information indicative of a CRUD activity associated with the source partition 210 during the data migration event. The data migration activity information 404 may additionally or alternatively include transmission mechanism information indicative of a transmission mechanism for the event data object 402 and/or one or more other event data objects during the data migration event. In some examples, the transmission mechanism may include SNS, SQS, or another type of transmission mechanism. The data migration activity information 404 may additionally or alternatively data status information indicative of a real-time status for the event data object 402 and/or one or more other event data objects during the data migration event. For example, the data status information may indicate that data associated with the event data object 402 is successfully transferred and processed at the destination partition 211. In another example, the data status information may indicate that data associated with the event data object 402 has not been successfully transferred and from the source partition 210. As such, in various embodiments, the one or more data ledgers 111 may be configured to store and/or update partition activity information, transmission mechanism information, data status information, and/or other data migration activity information in the one or more data ledgers 111.

In some embodiments, to facilitate configuration of the one or more data ledgers 111 and/or one or more other data ledgers associated with the application framework system 105 prior to receiving the event data object 402, the data ledger apparatus 120 may configure the one or more data ledgers 111 for a first type of data migration activity (e.g., partition activity information, etc.). Additionally, the data ledger apparatus 120 may configure at least one different data ledger for a second type of data migration activity (e.g., transmission mechanism information, etc.). As such, in response to receiving the event data object 402, the data ledger apparatus 120 may determine that that the event data object 402 is associated with the first type of data migration activity. Additionally or alternatively, in response to receiving the event data object 402, the data ledger apparatus 120 may update the one or more data ledgers 111 associated with the data migration event based at least in part on the first type of data migration activity (e.g., the partition activity information) associated with the event data object 402.

The data ledger apparatus 120 may additionally or alternatively configure the destination partition 211 based on the data migration activity information 404 stored in the one or more data ledgers 111. For example, the data ledger apparatus 120 may perform a configuration process 408 that includes initiating transmission of the event data object 402 to the destination partition 211, storing the event data object 402 in the source partition 210, storing the event data object 402 in the destination partition 211, and/or one or more other types of partition configuration based on the data migration activity information 404 stored in the one or more data ledgers 111.

In some embodiments, in response to completion of the configuration process 408, the data ledger apparatus 120 may automatically detect and/or repeat processing of the data migration event associated with the event data object 402 to further improve quality of the data migration activity information 404 stored in the one or more data ledgers 111 and/or to further improve integrity of the data stored in the destination partition 211. In some embodiments, a transport mechanism for the event data object 402 may be varied during the repeated processing of the data migration event. In some embodiments, a synchronous point to point call via a hypertext transfer protocol or another type of network protocol may be utilized to repeat the processing of the data migration event between partitions. In some embodiments, a message associated with the event data object 402 may be transmitted asynchronously via a transmission mechanism to facilitate the repeated processing of the data migration event.

Figure 5A:
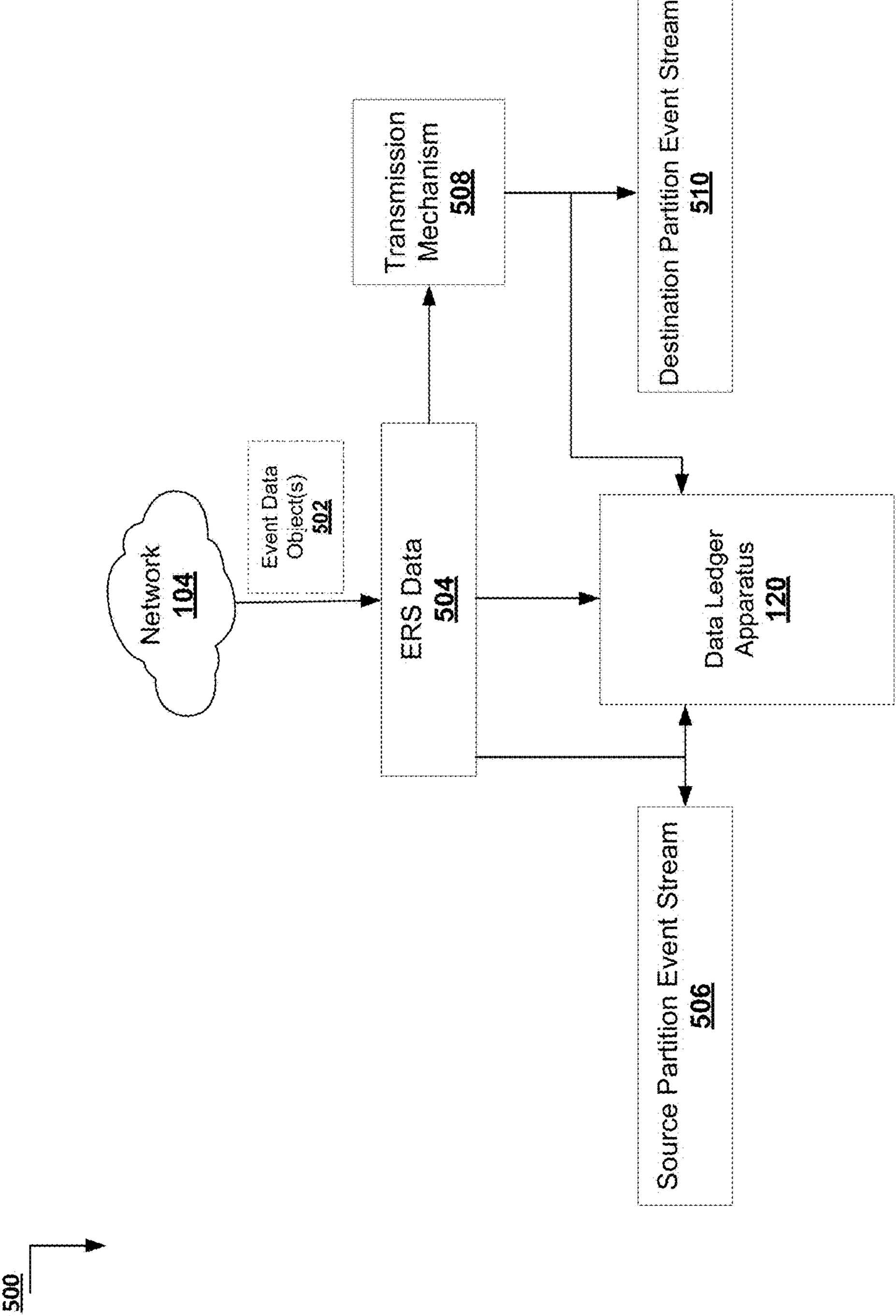
FIG. 5A illustrates an example application framework system in accordance with one or more embodiments of the present disclosure.

Referring to FIG. 5A, an example application framework system 500 is presented in accordance with one or more embodiments of the present disclosure. As shown, the application framework system 500 includes the network 104, the ERS data 504, the source partition event stream 506, the transmission mechanism 508, the destination partition event stream 510, and the data ledger apparatus 120. In one or more embodiments, the ERS data 504 may receive and/or detect, via the network 104, one or more event data objects 502. In some embodiments, the ERS data 504 may detect the one or more event data objects 502 by monitoring an event stream comprising a plurality of event data objects associated with the network 104. The one or more event data objects 502 may be associated with a data migration event. The data migration event may be indicative of data associated with the one or more event data objects 502 and stored in a source partition being migrated to a destination partition.

In some embodiments, the ERS data 504 may be, for example, associated with a source partition. Additionally, the ERS data 504 may be configured for ensuring actions required in various stages of a workflow associated with the application framework 106 are completed. In some embodiments, the ERS data 504 may be, for example, configured to ensure any event data objects 502 are transmitted to a destination partition associated with a data migration event. For example, the ERS data 504 may transmit the one or more event data objects 502 to the destination partition event stream 510 associated with a destination partition of a data migration event. In some embodiments, the ERS data 504 may transmit the one or more event data objects 502 that are pre-existing to a data migration event. In some embodiments, the ERS data 504 may transmit the one or more event data objects 502 that are generated/received during a data migration event. In some embodiments, the ERS data 504 may be configured to ensure all event data objects 502 associated with a data migration event are migrated completely and correctly (e.g., the one or more event data objects 502 are received at the destination partition and are identical upon arrival). In some embodiments, the ERS data 504 may be configured to provide information associated with the progress of a data migration event. In some embodiments, the ERS data 504 may be configured to transmit data and/or the one or more event data objects 502 to the source partition event stream 506, transmission mechanism 508, and data ledger apparatus 120.

In some embodiments, the source partition event stream 506 may be an event stream associated with a source partition of a data migration event. The source partition event stream 506 may receive, for example, the one or more event data objects 502 from ERS data 504. In some embodiments, event streams (e.g., source partition event stream 506, destination partition event stream 510) may be used to guarantee that each event data object can be queued for publishing to a transmission mechanism without forcing all event data objects associated with a data migration event to occur in a OLTP request flow. In some embodiments, the one or more event data objects 502 from the ERS data 504 transmitted to the source partition event stream 506 may also be transmitted to the data ledger apparatus 120. For example, the one or more event data objects 502 (e.g., data migration activity) may be transmitted transactionally to the source partition event stream 506 and the data ledger apparatus 120 together to ensure all CDC events are tracked by a data ledger during a data migration event. In some embodiments, data may be transmitted directly from the ERS data 504 to the data ledger apparatus 120. For example, the one or more event data objects 502 (e.g., associated with flagging partitions as migrating, bootstrap events, etc.) may be transmitted directly from the ERS data 504 to the data ledger apparatus 120. In some embodiments, the data ledger apparatus 120 may be configured to ensure data ledgers/data ledger entries are written for every event data object 502 before being sent to transmission mechanism 508 (e.g., to provide incremental completeness tracking, to provide OLTP speed query, etc.).

In some embodiments, the transmission mechanism 508 may be a transmission mechanism associated with transmitting data of a data migration event. For example, the transmission mechanism 508 may include SNS, SQS, or another type of transmission mechanism. The transmission mechanism 508 may, for example, receive the one or more event data objects 502 from ERS data 504. In some embodiments, the transmission mechanism 508 may transmit the one or more event data objects 502 to the destination partition event stream 510 and/or the data ledger apparatus 120. In some embodiments, the one or more event data objects 502 transmitted by the transmission mechanism 508 may be processed at the destination partition only once a data ledger/data ledger entry associated with the destination partition is consistent with the event data object 502. For example, the data ledger apparatus 120 may configure a destination partition based on the one or more event data objects 502 (e.g., data migration activity) stored in a data ledger/data ledger entry associated with the destination partition.

Figure 5B:
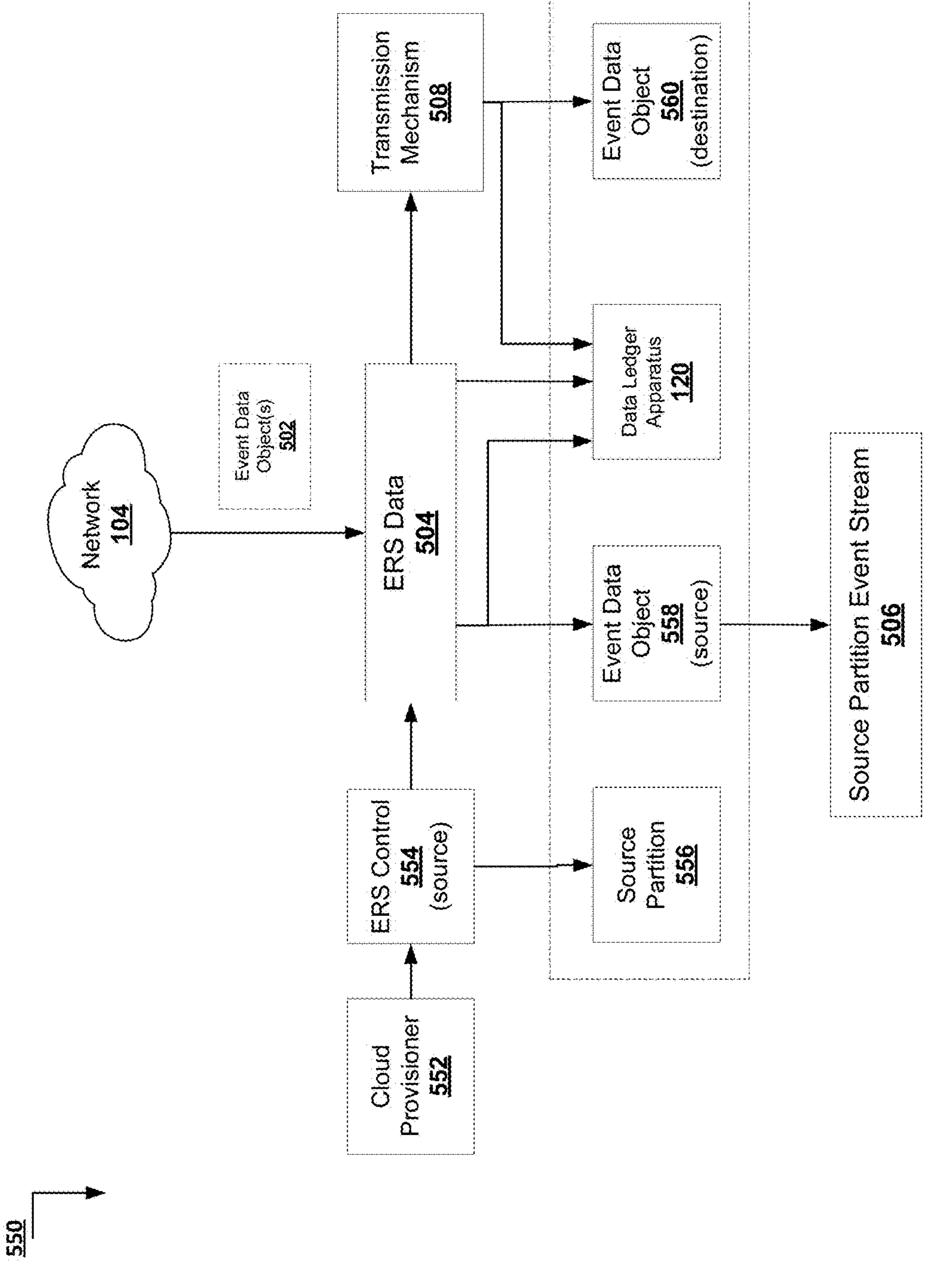
FIG. 5B illustrates another example application framework system in accordance with one or more embodiments of the present disclosure.

Referring to FIG. 5B, an example application framework system 550 is presented in accordance with one or more embodiments of the present disclosure. As shown, the application framework system 550 includes the network 104, the ERS data 504, ERS control 554, cloud provisioner 552, the transmission mechanism 508, source partition 556, event data object 558, the data ledger apparatus 120, event data object 560, and/or the source partition event stream 506. In one or more embodiments, the ERS data 504 may receive and/or detect the one or more event data objects 502 via the network 104. The ERS data 504 may be controlled by the ERS control 554 and/or cloud provisioner 552. In some embodiments, the cloud provisioner 552 may, for example, start a data migration event and/or transmit information associated with the start of a data migration event. For example, the cloud provisioner 552 may provide routing information, partition identifiers, configuration instructions, and/or the like associated with a data migration event via the ERS control 554. The ERS control 554 may be in communication (e.g., to transmit received information, read data for consistency, etc.) with the source partition 556 and/or the ERS data 504.

In some embodiments, the ERS data 504 may transmit the one or more event data objects 502 to the source partition event stream 506, the data ledger apparatus 120, and the transmission mechanism 508. The event data object 558 may be, for example, an event data object 502 associated with (e.g., routed to, stored within, etc.) the source partition 556. In some embodiments, each event data object 558 associated with the source partition 556 may be transmitted to a destination partition as an event data object 560 via the transmission mechanism 508. In some embodiments, the one or more event data objects 502 associated with a destination partition may be transmitted to a destination partition via transmission mechanism 508 as an event data object 560.

In some embodiments, a data ledger/data ledger entry of the data ledger apparatus 120 may correspond to each event data object 558 and each event data object 560. For example, the data ledger apparatus 120 may configure one or more data ledgers associated with the source partition 556 to store the event data object 558 associated with the source partition 556. Additionally, the data ledger apparatus 120 may configure one or more data ledgers associated with a destination partition to store the event data object 560 associated with the destination partition. In some embodiments, a data ledger/data ledger entry of the data ledger apparatus 120 may be used to query for the existence, status, or the like of the event data object 558 or the event data object 560. Accordingly, the data ledger apparatus 120 may be configured to store and/or update partition activity information associated with the source partition 556 and/or a destination partition, transmission mechanism information associated with the transmission mechanism 508, data status information of various event data objects (e.g., the one or more event data objects 502, event data object 558, event data object 560), and/or other data migration activity information. In some embodiments, a destination partition associated with a data migration event may be configured in association with a data ledger/data ledger entry of the data ledger apparatus 120. For example, a destination partition may be compared with a data ledger of the data ledger apparatus 120 associated with the destination partition to ensure any event data object 560 associated with the destination partition are consistent with the data ledger associated with the destination partition.

Figure 6:
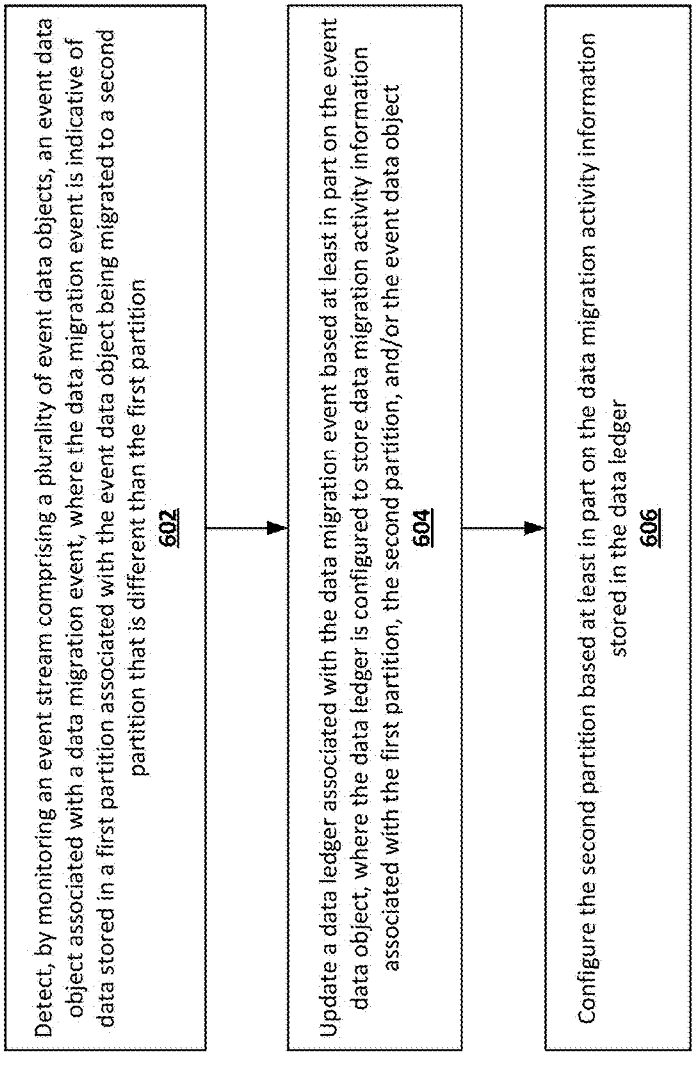
FIG. 6 is a flowchart diagram related to an example process for configuring a data partition based on a data ledger associated with a data migration event in accordance with one or more embodiments of the present disclosure.

FIG. 6 is a flowchart diagram of an example process 600 for configuring a data partition based on a data ledger associated with a data migration event in accordance with, for example, the data ledger apparatus 120. Via the various operations of process 600, the data ledger apparatus 120 may enhance the security and reliability of data of the application framework 106 and/or the database(s) 109. Via the various operations of process 600, the data ledger apparatus 120 may additionally or alternatively improve accuracy and/or quality of data stored in one or more data partitions associated with the application framework 106 and/or the database(s) 109.

The process 600 begins at operation 602 where an event data object associated with a data migration event is detected by monitoring an event stream comprising a plurality of event data objects, where the data migration event is indicative of data stored in a first partition associated with the event data object being migrated to a second partition that is different than the first partition. The process 600 additionally or alternatively includes an operation 604 that updates a data ledger associated with the data migration event based at least in part on the event data object, where the data ledger is configured to store data migration activity information associated with the first partition, the second partition, and/or the event data object. The process 600 additionally or alternatively includes an operation 606 that configures the second partition based at least in part on the data migration activity information stored in the data ledger.

In some embodiments, the first partition is a source partition and the second partition is a destination partition for the data migration event.

In some embodiments, the data migration activity information includes partition activity information indicative of a type of create, read, update, and delete (CRUD) activity associated with the first partition. Additionally, the process 600 additionally or alternatively includes an operation that updates the partition activity information stored in the data ledger based at least in part on the event data object.

In some embodiments, the data migration activity information additionally or alternatively includes transmission mechanism information indicative of a transmission mechanism for event data objects. Additionally, the process 600 additionally or alternatively includes an operation that updates the transmission mechanism information stored in the data ledger based at least in part on the event data object.

In some embodiments, the data migration activity information additionally or alternatively includes data status information indicative of a real-time status for event data objects. Additionally, the process 600 additionally or alternatively includes an operation that updates the data status information stored in the data ledger based at least in part on the event data object.

In some embodiments, the process 600 additionally or alternatively includes an operation that configures the first data ledger for a first type of data migration activity. In some embodiments, the process 600 additionally or alternatively includes an operation that configures a second data ledger for a second type of data migration activity. In some embodiments, the process 600 additionally or alternatively includes an operation that determines that the event data object is associated with the first type of data migration activity. In some embodiments, the process 600 additionally or alternatively includes an operation that updates the first data ledger associated with the data migration event based at least in part on the event data object.

In some embodiments, the data ledger is a first data ledger. Additionally, the process 600 additionally or alternatively includes an operation that configures the data ledger with a unique partition key based at least in part on (i) a type of data migration activity for the data ledger, (ii) at least one partition identifier for the first partition and the second partition associated with the data ledger, and (iii) at least one partition suffix for the first partition and the second partition associated with the data ledger. In some embodiments, the process 600 additionally or alternatively includes an operation that queries the data ledger using at least the unique partition key.

In some embodiments, the process 600 additionally or alternatively includes an operation that initiates transmission of the event data object to the second partition based at least in part on the data migration activity information stored in the data ledger.

In some embodiments, the process 600 additionally or alternatively includes an operation that stores the event data object in the first partition based at least in part on the data migration activity information stored in the data ledger.

In some embodiments, the process 600 additionally or alternatively includes an operation that receives an application programming interface (API) request associated with the data migration event. In some embodiments, the process 600 additionally or alternatively includes an operation that queries a set of data ledgers based at least in part on the API request to determine the data ledger associated with the data migration event.

In some embodiments, the process 600 additionally or alternatively includes an operation that generates an alert based at least in part on a result of the query. In some embodiments, the process 600 additionally or alternatively includes an operation that initiates a rendering of data associated with the alert via a display of a client device associated with the API request.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, e.g., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

The operations described herein may be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (Application Specific Integrated Circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web components, web services, web microservices, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information/data to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's query-initiating computing device in response to requests received from the web browser.

Embodiments of the subject matter described herein may be implemented in a computing system that includes a back-end component, e.g., as an information/data server, or that includes a middleware component, e.g., an application server, or that includes a front-end component, e.g., a query-initiating computing device having a graphical user interface or a web browser through which a user may interact with an implementation of the subject matter described herein, or any combination of one or more such back-end, middleware, or front-end components. The components of the system may be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) may be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising one or more processors and one or more storage devices storing instructions that are operable, when executed by the one or more processors, to cause the one or more processors to:

detect, by monitoring an event stream comprising a plurality of event data objects, an event data object associated with a data migration event, wherein the data migration event is indicative of data stored in a first partition associated with the event data object being migrated to a second partition that is different than the first partition;

update a data ledger entry of a data ledger associated with the data migration event based at least in part on the event data object, wherein the data ledger is configured to store data migration activity information associated with the first partition, the second partition, and the event data object, and wherein the data migration activity information indicates a particular type of data migration activity associated with the event data object; and based at least in part on a determination that the data migration activity information stored in the data ledger entry satisfies defined criterion associated with the event data object, configure the second partition based at least in part on the data migration activity information stored in the data ledger.

2. The apparatus of claim 1, wherein the first partition is a source partition and the second partition is a destination partition for the data migration event.

3. The apparatus of claim 1, wherein the data migration activity information comprises partition activity information indicative of a type of create, read, update, and delete (CRUD) activity associated with the first partition, wherein the instructions are operable, when executed by the one or more processors, to further cause the one or more processors to:

update the partition activity information stored in the data ledger based at least in part on the event data object.

4. The apparatus of claim 1, wherein the data migration activity information comprises transmission mechanism information indicative of a transmission mechanism for event data objects, wherein the instructions are operable, when executed by the one or more processors, to further cause the one or more processors to:

update the transmission mechanism information stored in the data ledger based at least in part on the event data object.

5. The apparatus of claim 1, wherein the data migration activity information comprises data status information indicative of a real-time status for event data objects, wherein the instructions are operable, when executed by the one or more processors, to further cause the one or more processors to:

update the data status information stored in the data ledger based at least in part on the event data object.

6. The apparatus of claim 1, wherein the data ledger is a first data ledger, and wherein the instructions are operable, when executed by the one or more processors, to further cause the one or more processors to:

configure the first data ledger for a first type of data migration activity;

configure a second data ledger for a second type of data migration activity;

determine that the event data object is associated with the first type of data migration activity; and update the first data ledger associated with the data migration event based at least in part on the event data object.

7. The apparatus of claim 1, wherein the data ledger is a first data ledger, and wherein the instructions are operable, when executed by the one or more processors, to further cause the one or more processors to:

configure the data ledger with a unique partition key based at least in part on (i) a type of data migration activity for the data ledger, (ii) at least one partition identifier for the first partition and the second partition associated with the data ledger, and (iii) at least one partition suffix for the first partition and the second partition associated with the data ledger; and query the data ledger using at least the unique partition key.

8. The apparatus of claim 1, wherein the instructions are operable, when executed by the one or more processors, to further cause the one or more processors to:

initiate transmission of the event data object to the second partition based at least in part on the data migration activity information stored in the data ledger.

9. The apparatus of claim 1, wherein the instructions are operable, when executed by the one or more processors, to further cause the one or more processors to:

store the event data object in the first partition based at least in part on the data migration activity information stored in the data ledger.

10. The apparatus of claim 1, wherein the instructions are operable, when executed by the one or more processors, to further cause the one or more processors to:

receive an application programming interface (API) request associated with the data migration event; and query a set of data ledgers based at least in part on the API request to determine the data ledger associated with the data migration event.

11. The apparatus of claim 10, wherein the instructions are operable, when executed by the one or more processors, to further cause the one or more processors to:

generate an alert based at least in part on a result of the query; and initiate a rendering of data associated with the alert via a display of a client device associated with the API request.

12. A computer-implemented method, comprising:

detecting, by monitoring an event stream comprising a plurality of event data objects, an event data object associated with a data migration event, wherein the data migration event is indicative of data stored in a first partition associated with the event data object being migrated to a second partition that is different than the first partition;

updating a data ledger entry of a data ledger associated with the data migration event based at least in part on the event data object, wherein the data ledger is configured to store data migration activity information associated with the first partition, the second partition, and the event data object, and wherein the data migration activity information indicates a particular type of data migration activity associated with the event data object; and based at least in part on a determination that the data migration activity information stored in the data ledger entry satisfies defined criterion associated with the event data object, configuring the second partition based at least in part on the data migration activity information stored in the data ledger.

13. The computer-implemented method of claim 12, wherein the data migration activity information comprises partition activity information indicative of a type of create, read, update, and delete (CRUD) activity associated with the first partition, and the computer-implemented method further comprising:

updating the partition activity information stored in the data ledger based at least in part on the event data object.

14. The computer-implemented method of claim 12, wherein the data migration activity information comprises transmission mechanism information indicative of a transmission mechanism for event data objects, and the computer-implemented method further comprising:

updating the transmission mechanism information stored in the data ledger based at least in part on the event data object.

15. The computer-implemented method of claim 12, wherein the data migration activity information comprises data status information indicative of a real-time status for event data objects, and the computer-implemented method further comprising:

updating the data status information stored in the data ledger based at least in part on the event data object.

16. The computer-implemented method of claim 12, wherein the data ledger is a first data ledger, and the computer-implemented method further comprising:

configuring the first data ledger for a first type of data migration activity;

configuring a second data ledger for a second type of data migration activity;

determining that the event data object is associated with the first type of data migration activity; and updating the first data ledger associated with the data migration event based at least in part on the event data object.

17. The computer-implemented method of claim 12, wherein the data ledger is a first data ledger, and the computer-implemented method further comprising:

configuring the data ledger with a unique partition key based at least in part on (i) a type of data migration activity for the data ledger, (ii) at least one partition identifier for the first partition and the second partition associated with the data ledger, and (iii) at least one partition suffix for the first partition and the second partition associated with the data ledger; and querying the data ledger using at least the unique partition key.

18. A computer program product comprising at least one non-transitory computer readable storage medium having computer executable code portions stored therein, the computer executable code portions comprising program code instructions configured to:

detect, by monitoring an event stream comprising a plurality of event data objects, an event data object associated with a data migration event, wherein the data migration event is indicative of data stored in a first partition associated with the event data object being migrated to a second partition that is different than the first partition;

update a data ledger entry of a data ledger associated with the data migration event based at least in part on the event data object, wherein the data ledger is configured to store data migration activity information associated with the first partition, the second partition, and the event data object, and wherein the data migration activity information indicates a particular type of data migration activity associated with the event data object; and based at least in part on a determination that the data migration activity information stored in the data ledger entry satisfies defined criterion associated with the event data object, configure the second partition based at least in part on the data migration activity information stored in the data ledger.

19. The computer program product of claim 18, wherein the data migration activity information comprises partition activity information indicative of a type of create, read, update, and delete (CRUD) activity associated with the first partition, and the program code instructions further configured to:

update the partition activity information stored in the data ledger based at least in part on the event data object.

20. The computer program product of claim 18, wherein the data migration activity information comprises data status information indicative of a real-time status for event data objects, and the program code instructions further configured to:

update the data status information stored in the data ledger based at least in part on the event data object.

* * * * *